US011879598B2

(12) United States Patent
Lombard et al.

(10) Patent No.: US 11,879,598 B2
(45) Date of Patent: Jan. 23, 2024

(54) METHOD FOR DETERMINING AN OPTIMAL VALUE OF AT LEAST ONE PARAMETER FOR IMPLEMENTING A METHOD FOR COOLING A WATERTIGHT AND THERMALLY INSULATING TANK

(71) Applicant: GAZTRANSPORT ET TECHNIGAZ, Saint Remy les Chevreuse (FR)

(72) Inventors: Fabrice Lombard, Saint Remy les Chevreuse (FR); Maxime Coyen, Saint Remy les Chevreuse (FR)

(73) Assignee: GAZTRANSPORT ET TECHNIGAZ, Saint Remy les Chevreuse (FR)

( * ) Notice: Subject to any disclaimer, the term of this patent is extended or adjusted under 35 U.S.C. 154(b) by 932 days.

(21) Appl. No.: 16/762,015

(22) PCT Filed: Feb. 23, 2018

(86) PCT No.: PCT/FR2018/050438
§ 371 (c)(1),
(2) Date: May 6, 2020

(87) PCT Pub. No.: WO2019/092331
PCT Pub. Date: May 16, 2019

(65) Prior Publication Data
US 2021/0372568 A1 Dec. 2, 2021

(30) Foreign Application Priority Data
Nov. 10, 2017 (FR) ....................................... 1760590

(51) Int. Cl.
*F17C 6/00* (2006.01)
*F17C 3/02* (2006.01)
*F17C 13/02* (2006.01)

(52) U.S. Cl.
CPC .............. *F17C 6/00* (2013.01); *F17C 13/025* (2013.01); *F17C 2203/0379* (2013.01);
(Continued)

(58) Field of Classification Search
CPC .. F27C 6/00; F27C 13/023; F27C 2203/0379; F27C 2205/0323; F27C 221/033;
(Continued)

(56) References Cited

FOREIGN PATENT DOCUMENTS

| | | | |
|---|---|---|---|
| FR | 2517802 | A1 | 6/1983 |
| FR | 2691520 | A1 | 11/1993 |

(Continued)

OTHER PUBLICATIONS

FR-2832211-A1 translation.*
International Search Report for corresponding PCT application No. PCT/FR2018/050438, dated May 3, 2018.

*Primary Examiner* — Elizabeth J Martin
(74) *Attorney, Agent, or Firm* — Notaro, Michalos & Zaccaria P.C.

(57) ABSTRACT

A method of determining an optimum value of at least one first parameter of execution of a process for cooling an internal space of a tank, including testing a plurality of different values of the first parameter, each phase of testing one of the values of the first parameter including cooling the internal space of the tank, the cooling power $P_f$ or the setpoint final temperature $T_c$ being representative of the tested value of the first parameter. The steps include loading liquefied gas into the internal space of the tank after cooling, measuring a variable P1 representative of the pressure inside the thermal insulation barrier and comparing it to at least one particular threshold, and detecting a fault if the variable P1 crosses the at least one particular threshold, and choosing, among the plurality of values tested, the optimum value of the first parameter during the corresponding test phase.

12 Claims, 4 Drawing Sheets

(52) U.S. Cl.
CPC *F17C 2205/0323* (2013.01); *F17C 2221/033* (2013.01); *F17C 2221/035* (2013.01); *F17C 2223/0153* (2013.01); *F17C 2223/033* (2013.01); *F17C 2225/0153* (2013.01); *F17C 2225/033* (2013.01); *F17C 2227/0339* (2013.01); *F17C 2227/0376* (2013.01); *F17C 2227/04* (2013.01); *F17C 2260/021* (2013.01); *F17C 2260/025* (2013.01); *F17C 2270/0105* (2013.01)

(58) Field of Classification Search
CPC ............ F27C 221/035; F27C 2223/033; F27C 2225/0153; F27C 2225/033; F27C 2227/0339; F27C 2227/0376; F27C 2227/04
See application file for complete search history.

(56) References Cited

FOREIGN PATENT DOCUMENTS

| | | | | |
|---|---|---|---|---|
| FR | 2832211 | A1 * | 5/2003 | ............. B63B 25/16 |
| FR | 2832211 | A1 | 5/2003 | |
| FR | 2877638 | A1 | 5/2006 | |
| WO | 2010139914 | A1 | 12/2010 | |
| WO | 14057221 | A2 | 4/2014 | |
| WO | 2016128696 | A1 | 8/2016 | |
| WO | 2017017364 | A2 | 2/2017 | |

* cited by examiner

METHOD FOR DETERMINING AN OPTIMAL VALUE OF AT LEAST ONE PARAMETER FOR IMPLEMENTING A METHOD FOR COOLING A WATERTIGHT AND THERMALLY INSULATING TANK

TECHNICAL FIELD

The invention relates to the field of fluid-tight and thermally insulative tanks for storing a cargo of liquefied gas, such as liquefied natural gas (LNG).

It relates more particularly to a method for determining an optimum value of at least one parameter for implementing a process for cooling a fluid-tight and thermally insulative tank.

TECHNOLOGICAL BACKGROUND

In the prior art, it is known to cool the tanks of ships intended for the transportation of liquefied natural gas before loading the cargo into the tank. This cooling aims to reduce the temperature inside the tank, in particular in order to prevent excessive vaporization of the liquefied gas during loading, to limit the intensity of the thermal stresses in certain components accommodated in the tank and to prevent situations liable to degrade the safety and/or integrity of the tank. This cooling step is carried out by spraying and vaporizing liquefied gas in the upper part of the tank.

In some applications the liquefied gas intended to be used for cooling is supplied by the loading terminal and the vapor produced during the vaporization of the liquefied gas in the tank is extracted from the tank and returned to the loading terminal. The operation continues until the mean temperature inside the tank is below a threshold temperature. The duration of the aforementioned step of cooling the tank is relatively long, of the order of 10 to 20 hours, which leads to the ship being immobilized for a long time when loading. Moreover, a large quantity of liquefied gas is necessary for cooling the tank.

Moreover, in other applications, it is also known to cool the tank by spraying and vaporizing in the upper part of the tank liquefied gas remaining in the tank. However the prior art cooling procedures necessitate a large quantity of liquefied gas. Now, the quantity of liquefied gas that has to be retained in the tank reduces the transport capacity.

SUMMARY

An idea on which the invention is based is to propose a method for determining at least one parameter of use of a process for cooling a fluid-tight and thermally insulative tank enabling the efficiency of the cooling process to be increased, in particular by reducing its duration and/or by reducing the quantity of liquefied gas necessary for using it, whilst guaranteeing the safety and integrity of the structure of the tank.

In accordance with one embodiment, the invention provides a method for determining an optimum value of at least one first parameter of execution of a process for cooling an internal space of a fluid-tight and thermally insulative tank intended to be loaded with liquefied gas, said first parameter being chosen among a setpoint final temperature of the cooling method and a variable operating on the cooling power of the cooling process; said tank including at least a thermal insulation barrier and a sealing membrane supported by the thermal insulation barrier and defining the internal space; the method including:

successively testing a plurality of different values of said first parameter, each phase of testing one of the values of the first parameter including:

- cooling the internal space of the tank by delivering a cooling power $P_f$ for a time Δ until the temperature in the internal space of the tank reaches a setpoint final temperature $T_c$; said cooling power $P_f$ or said setpoint final temperature $T_c$ being representative of the tested value of said first parameter;
- loading liquefied gas into the internal space of the tank after cooling;
- measuring a variable $P_1$ representative of the pressure inside the thermal insulation barrier during cooling of the internal space of the tank and/or during loading of the liquefied gas into the internal space of the tank and comparing it to at least one particular threshold; and
- detecting a fault if the variable $P_1$ crosses the at least one particular threshold; and
- choosing, among the plurality of values tested, as the optimum value of the first parameter the value for which, during the corresponding test phase, the cooling time Δ in the internal space is the shortest and no fault has been detected.

This kind of method therefore enables the efficiency of the cooling process to be increased whilst guaranteeing the safety and the integrity of the tank through surveillance to ensure that the optimum value of the parameter for execution of the process for cooling the tank does not lead to a critical pressure in the thermal insulation barrier.

In accordance with various embodiments, a method of this kind may include one or more of the following features.

In accordance with one embodiment, the first parameter is the variable operating on the cooling power of the cooling process. In this case, the variable $P_1$ is measured and compared to a threshold at least during the cooling of the internal space of the tank.

In accordance with one embodiment, the first parameter is the setpoint final temperature of the cooling process. In this case, the variable $P_1$ is measured and compared to a threshold at least during the loading of the liquefied gas into the internal space of the tank.

In accordance with one embodiment, the various values of said first parameter are incremented and a plurality of different values of said first parameter are tested until, during the test phase of at least one of the values, a fault is detected and, during the test phase of at least one other of the values, no fault is detected.

In accordance with one embodiment, the at least one particular threshold includes a constant threshold $Ps_1$ that is greater than or equal to atmospheric pressure and a fault is detected if the variable $P_1$ is less than or equal to $Ps_1$. This makes it possible to ensure the safety of the tank by guaranteeing that, for the optimum value of the first parameter, the thermal insulation barrier remains pressurized in order to prevent the entry of air into said thermal insulation barrier.

In accordance with one embodiment, for each test phase, a variable $P_{tank}$ representative of the pressure inside the internal space of the tank is measured, the at least one particular threshold includes a variable threshold corresponding to the variable $P_{tank}$ and a fault is detected if the variable $P_1$ is greater than or equal to $P_{tank}$. This makes it possible, for the optimum value of the first parameter, to prevent the thermal insulation barrier being pressurized relative to the internal space of the tank because such a condition is liable to lead to tearing of the sealing membrane.

In accordance with one embodiment, the thermal insulation barrier is a primary thermal insulation barrier, the tank further including a secondary thermally barrier resting against a support structure and a secondary sealing membrane disposed between the secondary thermally barrier and the primary thermal insulation barrier. For each test phase, a variable $P_2$ representative of the pressure inside the secondary thermal insulation barrier is measured during the cooling of the internal space of the tank and/or during the loading of the liquefied gas into the internal space of the tank and the variable $P_2$ is compared to at least one particular secondary threshold and a fault is detected if the variable $P_2$ crosses said at least one particular secondary threshold. Accordingly, when the tank has two sealing membranes and two thermal insulation barriers, the method makes it possible to increase the efficiency of the cooling process whilst guaranteeing the safety and the integrity of the tank through surveillance to ensure that the optimum value of the parameter of use of the process for cooling the tank does not lead to a critical pressure in one of the two thermal insulation barriers.

In accordance with one embodiment, if the first parameter is the variable operating on the cooling power of the cooling process, the variable $P_2$ is measured and compared to the secondary threshold at least during the cooling of the internal space of the tank.

In accordance with one embodiment, if the first parameter is the setpoint final temperature of the cooling process, the variable $P_2$ is measured and compared to the secondary threshold at least during the loading of the liquefied gas into the internal space of the tank.

In accordance with one embodiment, the at least one particular secondary threshold includes a constant secondary threshold $Ps_2$ that is greater than or equal to atmospheric pressure and a fault is detected if the variable $P_2$ is less than or equal to $Ps_2$. This makes it possible to ensure the safety of the tank by guaranteeing that the secondary thermal insulation barrier remains pressurized for the optimum value of the first parameter.

In accordance with one embodiment, the at least one particular secondary threshold includes a variable secondary threshold equal to the variable $P_1$ and a fault is detected if the variable $P_2$ is greater than or equal to $P_1$. This makes it possible to protect the secondary sealing membrane because the latter is liable to be torn if the pressure in the secondary thermal insulation barrier is greater than that in the primary thermal insulation barrier.

In accordance with one embodiment, for each test phase, there is a variable $P_{tank}$ representative of the pressure inside the internal space of the tank is measured and compared to a constant threshold $Pc_1$ that is greater than atmospheric pressure during the cooling of the internal space of the tank and/or during the loading of the liquefied gas into the internal space of the tank and a fault is detected if the variable $P_{tank}$ is greater than or equal to $Pc_1$. This makes it possible to ensure that, for the optimum value of the first parameter, the vapor circuit is able to evacuate from the internal space of the tank a sufficient vapor phase flow rate to prevent pressurization.

In accordance with one embodiment, if the first parameter is the variable operating on the cooling power of the cooling process, the variable $P_{tank}$ is compared to $Pc_1$ at least during the cooling of the internal space of the tank.

In accordance with one embodiment, if the first parameter is the setpoint final temperature of the cooling process, the variable $P_{tank}$ is compared to $Pc_1$ at least during the loading of the liquefied gas into the internal space of the tank.

In accordance with one embodiment, the tank is integrated into a ship, each test phase includes a step of sailing under load in which, after loading the liquefied gas into the internal space, the ship sails. During the sailing step a variable $P_{tank}$ representative of the pressure inside the internal space of the tank is measured and the variable $P_{tank}$ is compared to a constant threshold $Pc_2$ that is greater than atmospheric pressure and a fault is detected if the variable $P_{tank}$ is greater than or equal to $Pc_2$. This makes it possible to ensure that, for the optimum value of the first parameter, the requirements and/or the capacities of the circuit using the vapor phase gas are sufficient to prevent too great an increase in pressure in the internal space of the tank when the ship is sailing.

In accordance with one embodiment, after the optimum value of the first parameter has been chosen, a plurality of different values of a second parameter are tested, the first and the second parameters respectively corresponding to the setpoint final temperature of the cooling process and to the variable operating on the cooling power during the execution of the process or vice versa; each test phase of one of the values of the second parameter including:

- cooling the internal space of the tank by delivering a cooling power $P_f$ for a time $\Delta$ until the temperature in the internal space of the tank reaches a setpoint final temperature $T_c$; said cooling power $P_f$ and said setpoint final temperature $T_c$ being respectively representative of the optimum value of the first parameter and of the tested value of said second parameter or vice versa;
- loading liquefied gas into the internal space of the tank after cooling; and
- measuring a variable $P_1$ representative of the pressure inside the thermal insulation barrier during cooling of the internal space of the tank and/or during loading of the liquefied gas into the internal space of the tank and comparing it to said at least one particular threshold; and
- detecting a fault if the variable $P_1$ crosses said at least one particular threshold; and
- choosing, among the plurality of values tested, as the optimum value of the second parameter the value for which, during the corresponding test phase, the time $\Delta$ to cool the internal space is the shortest and no fault has been detected.

In accordance with one embodiment, the internal space of the tank is cooled by means of a cooling unit including at least one spray manifold that is disposed in the internal space of the tank and that includes a plurality of spray nozzles arranged to spray liquefied gas into the internal space of the tank.

In accordance with one embodiment, the spray manifold is connected to at least one adjustable opening valve adapted to operate on the spray flow rate and the variable operating on the cooling power of the cooling process corresponds to the degree of opening of the adjustable opening valve.

In accordance with one embodiment, the invention also provides a process for loading a ship equipped with a fluid-tight and thermally insulative tank intended to store liquefied gas, in which:

- the aforementioned method is employed to determine an optimum value of at least one first parameter of execution of a cooling process;

cooling the internal space of the tank is cooled until the temperature in the internal space of the tank reaches a setpoint final temperature; the cooling power or the setpoint final temperature being representative of the optimum value of the first parameter; and a liquefied gas is fed through insulated pipes from a floating or terrestrial storage installation to the internal space of the tank.

BRIEF DESCRIPTION OF THE FIGURES

The invention will be better understood and other objects, details, features and advantages thereof will become more clearly apparent during the following description with reference to the appended drawings of a plurality of embodiments of the invention, provided by way of nonlimiting illustration only.

DETAILED DESCRIPTION OF EMBODIMENTS

Figure 1:
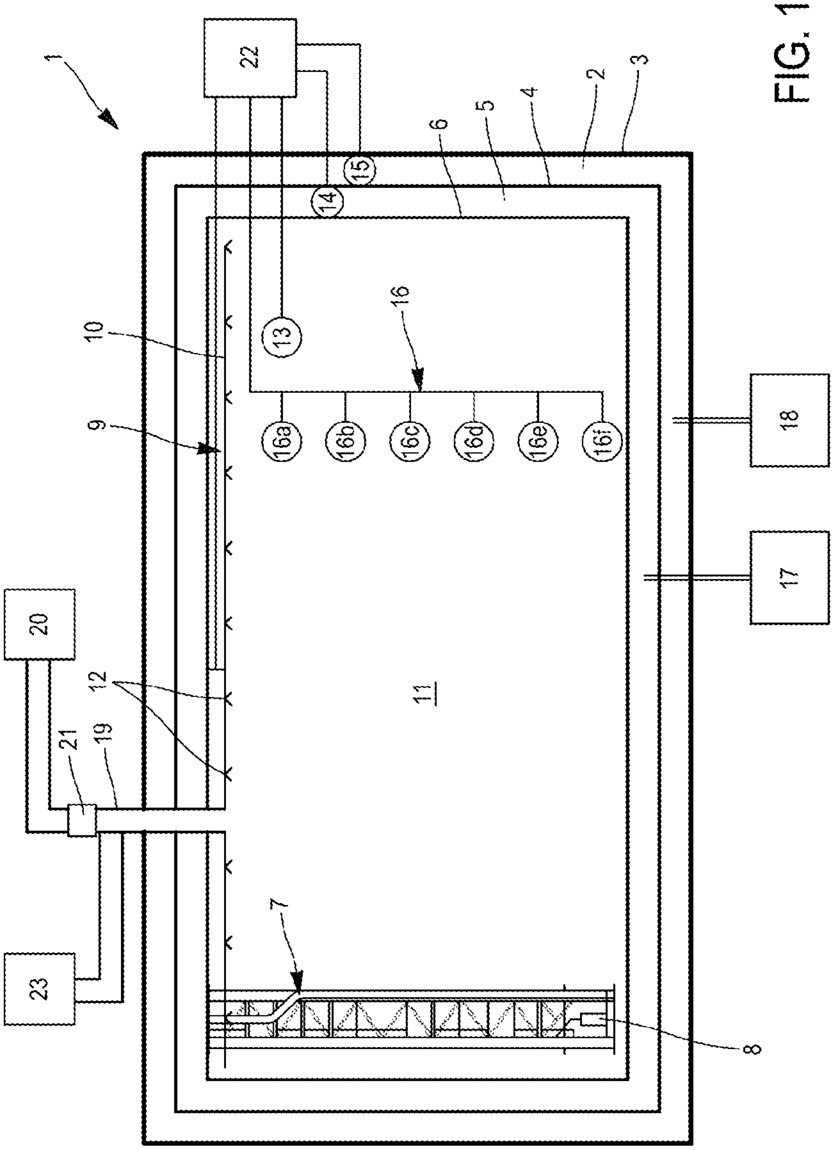
FIG. 1 is a schematic illustration of a tank intended to transport liquefied natural gas.

In FIG. 1, a tank 1 for storing a liquefied gas is represented. A tank 1 of this kind may in particular be installed on a floating structure, for example a ship for transporting liquefied natural gas, such as a methane tanker or an ethane tanker.

The tank 1 is a membrane tank for storing liquefied gas. The tank 1 has a multilayer structure including, from the exterior to the interior, a secondary thermal insulation barrier 2 including insulative elements, not represented, resting against a support structure 3, a secondary sealing membrane 4 resting against the secondary thermal insulation barrier 2, a primary thermal insulation barrier 5 including insulative elements, not represented, resting against the secondary sealing membrane 4, and a primary sealing membrane 6 intended to be in contact with the liquefied gas contained in the tank 1. The primary sealing membrane 6 defines an internal space 11 intended to receive the liquefied gas. By way of example, membrane tanks of this kind are described in particular in the patent applications WO14057221, FR2691520 and FR2877638 respectively concerning the Mark V, Mark III and NO96 technologies developed by the applicant.

The liquefied gas intended to be stored in the tank 1 may in particular be a liquefied natural gas (LNG), that is to say a gaseous mixture including mainly methane as well as one or more other hydrocarbons. The liquefied gas may equally be ethane or a liquefied petroleum gas (LPG), that is to say a mixture of hydrocarbons resulting from the refining of petroleum and essentially including propane and butane.

In the embodiment represented the tank 1 also includes a loading/offloading tower 7 in particular for loading the cargo into the tank 1 before its transportation and offloading the cargo after its transportation. The loading/offloading tower 7 includes a tripod type structure, that is to say one including three vertical pylons connected to one another by crossmembers and each defining a line for loading and/or offloading the cargo and/or a standby well for lowering into the tank a standby offloading pump and an offloading line. The loading/offloading tower 7 supports at its lower end one or more pumps 8 for offloading the cargo.

Moreover, the primary thermally insulating barrier 5 and the secondary thermally insulating barrier 2 are each connected to an inerting device 17, 18 adapted to inject inert gas, such as nitrogen, into the thermal insulation barrier 2, 5 in question. The function of the inerting devices 17, 18 is to maintain an internal atmosphere in the primary thermal insulation barrier 5 and the secondary thermal insulation barrier 2 which prevents the presence of air in the thermal insulation barriers 2, 5. Now, the presence of air must imperatively be prevented because air mixed with the liquefied gas of the cargo would be liable to form an inflammable mixture. The inerting devices 17, 18 are also used to maintain the primary thermal insulation barrier 5 and the secondary thermal insulation barrier 2 under pressure, that is to say at a pressure higher than atmospheric pressure, in order to prevent any entry of air into the thermal insulation barriers 2, 5. Each of the inerting devices 17, 18 includes a pump for circulating the inert gas in the respective thermal insulation barrier 2, 5 that is connected to an inert gas generator, for example a gasifier that evaporates liquid nitrogen. Each inerting device 17, 18 is controlled to slave the pressure inside the primary thermal insulation barrier 5 and the secondary thermal insulation barrier 2 to a setpoint pressure that is above atmospheric pressure.

Moreover, the tank 1 is equipped with a vapor collector conduit 19 that passes through the ceiling wall of the tank 1 and is connected to a circuit 20 using the vapor phase gas. The vapor conduit 19 is equipped with a safety valve 21 that is set to evacuate the vapor phase gas if the pressure of vapor in the internal space 11 of the tank 1 is above a threshold pressure between 0.1 and 2 bar inclusive, and for example between 0.2 and 0.4 bar inclusive. This is aimed at controlling the pressure inside the tank 1 in such a manner as to prevent raised pressures liable to damage it.

Moreover, the circuit 20 using the vapor phase gas may include one or more of the following types of equipment: a burner, an electric power generator, a motor for the propulsion of a ship, and a reliquefaction device. To supply the motor for propelling the ship, the circuit using the vapor phase gas further includes compressors for compressing the gas upstream of said motor.

Moreover, the vapor collector conduit 19 is also connected to a vapor circuit 23 for returning vapor phase gas to the loading terminal when cooling the internal space 11 of the tank 1 and during loading of the tank 1 with liquefied gas. The vapor circuit 23 includes equipment, such as one or more compressors, for returning the vapor phase gas to the loading terminal.

The tank 1 also includes a unit 9 for cooling the tank. The unit 9 for cooling the tank includes one or more spray manifolds 10 disposed in the internal space 11 of the tank in the vicinity of the ceiling wall of the tank 1. The spray manifolds 10 are for example connected to a feed conduit, not shown, that passes through a wall of the tank 1 and is intended to be connected to a loading terminal. The spray manifolds 10 include spray nozzles 12 that are regularly distributed. In accordance with one embodiment, the spray manifolds 10 are connected to adjustable valves for varying the flow rate of liquefied gas that is vaporized in the internal space 11 of the tank 1 and therefore for varying the cooling power of the cooling unit 9. In accordance with other embodiments, the liquefied gas flow rate can also be modified by varying the pressure at which liquefied gas is fed to the spray manifolds 10.

Moreover, the tank 1 is equipped with a plurality of pressure sensors 13, 14, 15.

The tank 1 is more particularly equipped with:

- a pressure sensor 13 for delivering a measurement $P_{tank}$ of the pressure of the gas phase inside the internal space 11 of the tank 1;
- a pressure sensor 14 for delivering a measurement $P_1$ of the pressure of the gas phase inside the primary thermal insulation barrier 5; and
- a pressure sensor 15 for delivering a measurement $P_2$ of the pressure of the gas phase inside the secondary thermal insulation barrier 2.

The tank 1 also includes a temperature measuring device 16 for delivering one or more variables representative of the temperature of the gas phase in the internal space 11 of the tank 1. In accordance with the advantageous embodiment represented in FIG. 1, the temperature measuring device 16 includes a plurality of temperature sensors 16*a*, 16*b*, 16*c*, 16*d*, 16*e*, 16*f* that are vertically distributed in the internal space 11 of the tank. In this case, the temperature measuring device 16 is able to deliver a variable $T_{tank}$ that is representative of a mean temperature in the tank and that is calculated by averaging the temperature measurements delivered by a plurality of or all of the temperature sensors 16*a*, 16*b*, 16*c*, 16*d*, 16*e*, 16*f* of the temperature measuring device 16.

The cooling unit 9 is controlled by a control unit 22 that is in particular connected to the temperature measuring device 16.

The process for cooling the tank 1 is as follows. The cooling unit 9 is fed with liquefied gas coming for example from a loading terminal and vaporizes the liquefied gas in the tank 1 in such a manner as to cool the internal space 11. The cooling unit 9 therefore has a cooling power depending in particular on the flow rate of the liquefied gas supplied to the spray manifolds and of the latent heat of evaporation of the liquefied gas. The control unit 22 maintains the operation of the cooling unit 9 until the variable $T_{tank}$ delivered by the temperature measuring device 16 reaches a setpoint final temperature $T_c$.

Figure 2:
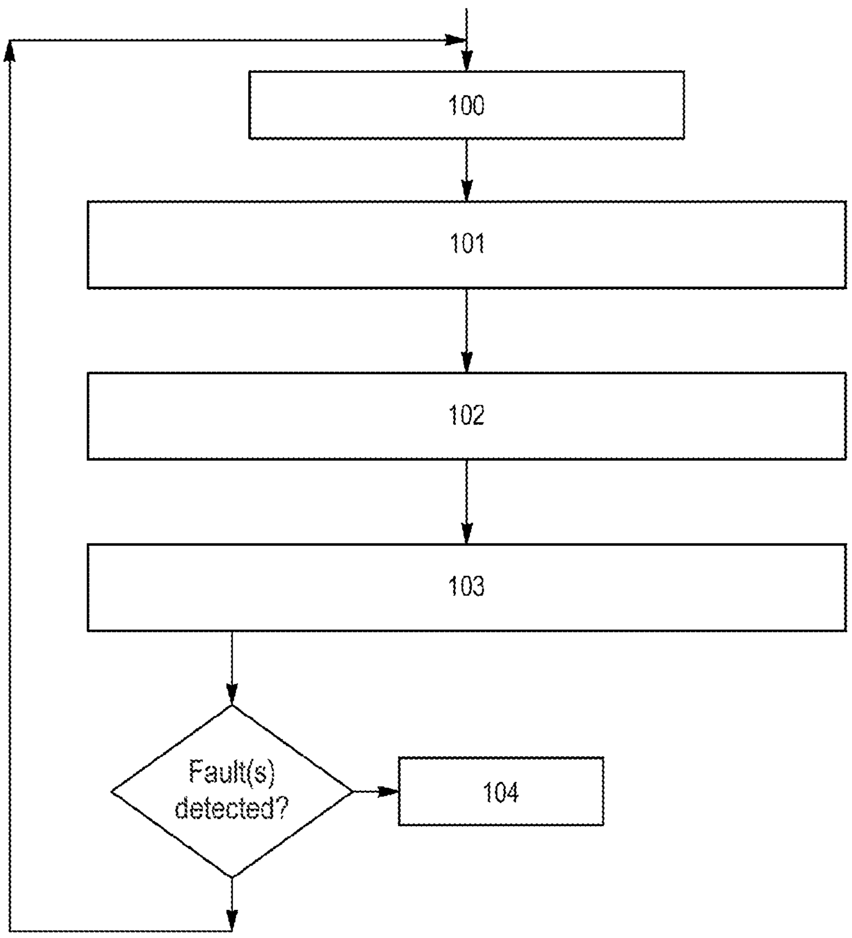
FIG. 2 is a diagram illustrating a method for determining an optimum value of a parameter of a process for cooling the tank.

Referring to the FIG. 2 diagram, there is now described a method for determining an optimum value of a parameter of use of the process for cooling the tank 1. In this embodiment, the parameter whose optimum value must be determined is the setpoint final temperature $T_c$. Also, in this embodiment there are successively tested a plurality of values of the setpoint final temperature $T_c$, the parameters of the cooling process influencing the cooling power being maintained constant for the plurality of test phases of the setpoint final temperature $T_c$ values.

Figure 3:
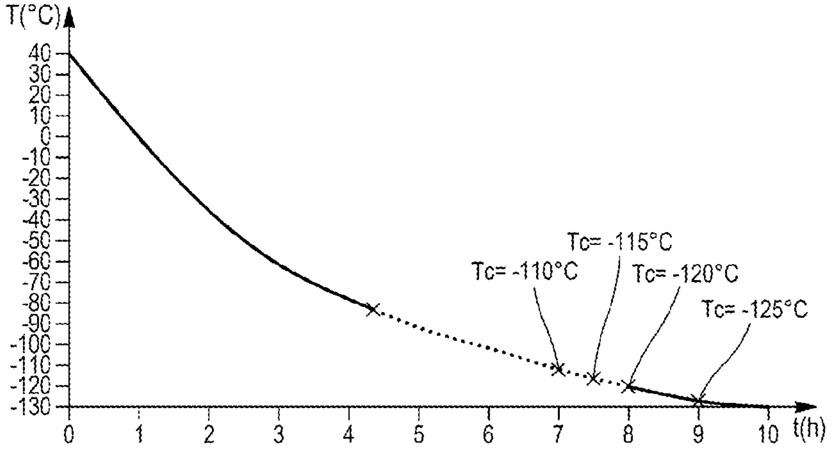
FIG. 3 is a graph representing a reference standard curve of a process for cooling the tank.

In accordance with one embodiment, the setpoint final temperature $T_c$ to be tested is increased in successive steps relative to a standard kinetic for cooling the tank 1 represented in FIG. 3. The reference standard kinetic from FIG. 3 corresponds to cooling the tank from an initial temperature of approximately 40° C. to a final temperature of −130° C. over a period of approximately 10 hours.

In each test phase, during a first step 100 the value of the setpoint final temperature $T_c$ to be tested is defined. In accordance with one embodiment, to define the setpoint final temperatures $T_c$ to be tested the setpoint final temperature $T_c$ is incremented successively, for example by steps of 5° C., starting from the final temperature of the reference standard kinetic represented in FIG. 3.

A plurality of setpoint final temperatures $T_c$ to be tested: −125° C., −120° C., −115° C. and −110° C. are represented by way of example in FIG. 3.

During a second step 101 the tank is cooled by delivering a constant cooling power $P_f$ for a time Δ until the temperature $T_{tank}$ in the internal space 11 of the tank 1 has reached the setpoint final temperature $T_c$ to be tested. During the second step 101 the tank is empty with the possible exception of liquid phase gas representing less than 10% of the volume of the tank 1.

It is important to ensure that the pressures in the primary thermal insulation barrier 5 and the secondary thermal insulation barrier 2 and in the internal space 11 of the tank 1 respect conditions guaranteeing the safety and the integrity of the tank 1.

Also, during this second step there are continuously measured the pressure $P_1$ inside the primary thermal insulation barrier 5, the pressure $P_2$ inside the secondary thermal insulation barrier 2, and the pressure $P_{tank}$ in the internal space 11.

Moreover, the pressure $P_1$ in the primary thermal insulation barrier 5 is compared to a constant threshold $Ps_1$ that is greater than or equal to atmospheric pressure and a fault is detected if the pressure $P_1$ is less than or equal to the threshold $Ps_1$. The threshold $Ps_1$ is for example equal to atmospheric pressure. Likewise, the pressure $P_2$ in the secondary thermal insulation barrier 2 is compared to a constant threshold $Ps_2$ that is greater than or equal to atmospheric pressure and a fault is detected if the pressure $P_2$ is less than or equal to the threshold $Ps_2$. The threshold $Ps_2$ is for example equal to atmospheric pressure. These verifications make it possible to ensure that the inerting devices 17, 18 enable generation of inert gas flow rates sufficient to compensate pressure drops in the primary thermal insulation barrier 5 and the secondary thermal insulation barrier 2 caused by the compression of the inert gas in said primary thermal insulation barrier 5 and said secondary thermal insulation barrier 2 as the temperature falls. Accordingly, the detection of a fault means that least one of the inerting devices 17, 18 is not able to maintain the respective thermal insulation barrier under pressure for the cooling conditions of the corresponding test phase.

Moreover, the pressure $P_1$ in the primary thermal insulation barrier 5 is also compared to the pressure $P_{tank}$ in the internal space 11 and a fault is detected if the pressure $P_1$ becomes greater than or equal to $P_{tank}$. Indeed, an increased pressure in the primary thermal insulation barrier 5 relative to the pressure in the internal space 11 of the tank 1 is liable to lead to tearing of the primary sealing membrane 6. To guarantee the integrity of the primary sealing membrane 6 it is then necessary to maintain a pressure in the primary thermal insulation barrier 5 that is lower than that in the internal space 11 of the tank 1 so that the pressure difference on either side of the primary sealing membrane 6 tends to press the latter against the secondary thermal insulation barrier 2 rather than to tear it away from the secondary thermal insulation barrier 2.

Moreover, in some embodiments, in particular when the secondary sealing membrane 6 is a metal membrane, as is the case in the NO96 and Mark V technologies, it is also necessary for the pressure inside the secondary thermal insulation barrier 2 to be lower than the pressure inside the primary thermal insulation barrier 5 so as to guarantee the integrity of the secondary sealing membrane 4. Also, in such circumstances the pressure $P_1$ in the primary thermal insulation barrier 5 is compared to the pressure $P_2$ in the secondary thermal insulation barrier 2 and a fault is detected if the pressure $P_2$ is greater than or equal to the pressure $P_1$.

Moreover, the pressure $P_{tank}$ in the internal space 11 of the tank 1 is compared to a constant threshold $Pc_1$ and a fault is detected if the pressure $P_{tank}$ is greater than or equal to the threshold $Pc_1$. The threshold $Pc_1$ is a constant threshold that is greater than atmospheric pressure. The threshold $Pc_1$ has a value less than or equal to the pressure to which the safety valve 21 is set. The threshold $Pc_1$ is for example of the order of 0.17 bar. This verification makes it possible to ensure that, for the cooling conditions of the corresponding test phase, the vapor circuit 23 and in particular the equipment thereof is able to evacuate a flow of vapor phase, for example to a loading terminal, to prevent too high an increase in pressure in the internal space 11 of the tank 1.

During a third step 102 the tank 1 is loaded with liquefied gas coming from a loading terminal. As during cooling of the tank (step 101), the pressures in the primary thermal insulation barrier 5 and the secondary thermal insulation barrier 2 and in the internal space 11 of the tank are compared to thresholds in order to verify that they respect the aforementioned conditions enabling the security and the integrity of the tank 1 to be guaranteed.

In particular, as during the cooling of the tank (step 101), it is continuously verified if at least one of the following inequalities is respected and a fault is detected if said inequality is no longer respected:

$$P_1 > Ps_1;$$

$$P_2 > Ps_2;$$

$$P_{tank} > P_1;$$

$$P_1 > P_2;$$

and $$Pc_1 > P_{tank}.$$

Moreover, after loading the liquefied gas into the internal space 11 of the tank 1, each test phase further entails a step of sailing under load (step 103) during which the ship sails.

During the step 103 of sailing under load, the pressure $P_{tank}$ in the internal space 11 of the tank 1 is compared to a constant threshold $Pc_2$ and a fault is detected if the pressure $P_{tank}$ is greater than or equal to the threshold $Pc_2$. The threshold $Pc_2$ is a constant threshold that is greater than atmospheric pressure. The threshold $Pc_2$ has a value less than or equal to the pressure to which the safety valve 21 is set. The threshold $Pc_2$ is for example of the order of 0.20 bar. This verification makes it possible to ensure that during the voyage of a ship at least one tank 1 of which has been cooled in accordance with the conditions of the cooling step of the corresponding test phase the requirements and/or the capacities of the circuit 20 using the gas in the vapor phase are sufficient to prevent too high a rise in pressure in the internal space 11 of the tank 1.

If a fault is detected in one of the aforementioned steps 101, 102, 103 the tests are then stopped. There is then chosen as the optimum value of the setpoint temperature $T_c$ the preceding lower value tested, that is to stay the value for which, during the test phase, the time to cool the tank 1 is the shortest and none of the aforementioned faults has been detected (step 104).

In contrary, if no fault has been detected during one of the aforementioned steps for the tested value of the setpoint temperature $T_c$, then a new test phase including the steps 100, 101, 102 and 103 may be executed taking as a new value of the setpoint final temperature $T_c$ to be tested a value greater than that of the preceding test phase.

A plurality of test phases are executed until a value of the parameter to be tested leads to the detection of a fault.

In accordance with one embodiment, the control unit 22 stores the evolution of the various variables $T_{tank}$, $P_{tank}$, $P_1$ and $P_2$ measured, carries out the aforementioned comparison between the various variables and thresholds, stores the faults detected and delivers the optimum value of the parameter in question.

Note however that, in some applications, some equipment of the tank, such as the tripod structure of the loading/offloading tower 7 or the pump 8 for example, are sensitive to thermal shocks. The limit specifications for cooling of that equipment is then also liable to limit the increase in the setpoint final temperature $T_c$. Also, account may be taken of these constraints by verifying that for the setpoint temperature $T_c$ to be tested the temperature of said equipment sensitive to thermal shocks is less than the critical cooling temperature of said equipment, that is to say the temperature below which said equipment must have descended before loading the tank with liquefied gas. Alternatively, in order to avoid these constraints, it is equally possible to proceed to localized cooling of the equipment most sensitive to thermal shocks.

In accordance with another embodiment, the parameter of the cooling process the optimum value of which must be determined is not the setpoint final temperature $T_c$ but a variable operating on the cooling power delivered by the cooling unit 9. By way of example, the parameter to be tested may in particular be the degree of opening of the valves supplying the spray nozzles. In this embodiment, a plurality of values of opening of the valves is then tested while the setpoint final temperature $T_c$ is maintained constant for the plurality of test phases of the values of the degree of opening of the valves. The setpoint final temperature $T_c$ is for example of the order of 130° C.

Figure 4:
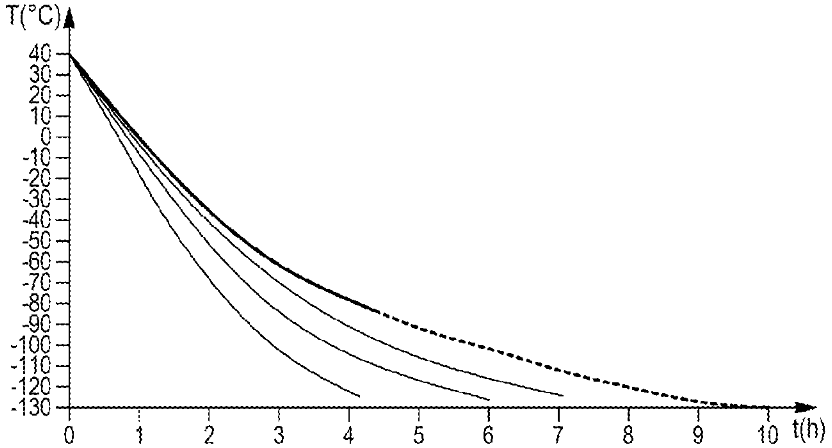
FIG. 4 is a graph representing a plurality of curves for cooling the tank.

FIG. 4 shows by way of example a plurality of tank cooling kinetics corresponding to different degrees of opening of the valves.

A method similar to that described with reference to FIG. 2 may be employed to determine an optimum opening value of the valves supplying the spray nozzles 12. The method is different however in that during the first step 100 a value of opening of the valves is defined. In accordance with one embodiment, to define the various degrees of opening of the valves to be tested there is successively increased the value of the opening of the valves, in constant steps, corresponding for example to 5% of the opening travel of said valves.

During the second step 101 the tank 1 is cooled by delivering a cooling power that depends on the value to be tested of the opening of the valves supplying the spray nozzles 12, until the temperature $T_{tank}$ in the internal space 11 of the tank 1 has reached the setpoint final temperature $T_c$.

The other characteristics of the steps 101, 102 and 103 described with reference to FIG. 2 that determine an optimum value of the openings of the valves are similar.

If a fault is detected in one of the aforementioned steps 101, 102, 103 the tests are then stopped. There is then chosen as the optimum value of the degree of opening of the valves the preceding value, that is to say the value for which, during the test phase, the cooling power is the highest (and consequently the time to cool the tank the shortest) and none of the verified faults has been detected (step 104).

In contrary, if no fault has been detected during one of the aforementioned steps for the tested degree of opening of the valves a new test phase including the steps 100, 101, 102 and 103 may be executed taking as the new value of the degree of opening to be tested a value greater than that of the preceding test phase.

A plurality of test phases are carried out until a value of the parameter to be tested leads to the detection of a fault.

This embodiment, in which the variable operating on the cooling power the optimum value of which must be determined corresponds to the degree of opening of the valves, is described by way of example. However, in other variant embodiments, the variable liable to be modified to operate on the cooling power is not the degree of opening of the valves and consists for example of the pressure at which the spray manifolds 10 are supplied.

Moreover, in accordance with an advantageous embodiment, there is firstly determined the optimum value of the setpoint final temperature $T_c$, using the method described with reference to FIG. 2. Secondly, there is then determined the optimum value of the variable operating on the cooling power, by the method described hereinabove, using the optimum value of the setpoint final temperature $T_c$ previously determined for testing the values of the variable operating on the cooling power.

In accordance with another variant embodiment, the process is executed in the reverse order, firstly determining the optimum value of the variable operating on the cooling power and secondly then determining the setpoint final temperature $T_c$ using the optimum value of the variable operating on the cooling power to test the values of the setpoint final temperature $T_c$.

When the optimum value of the aforementioned two parameters has been determined, the internal space 11 of the tank is cooled by delivering a cooling power $P_f$ until the temperature $T_{tank}$ in the internal space 11 of the tank 1 reaches a setpoint final temperature $T_c$; the cooling power $P_1$ and the setpoint final temperature $T_c$ each being representative of the optimum value of one and the other of the aforementioned two parameters. This ensures rapid cooling of the tank 1 without degrading the safety and the integrity of the tank during cooling, during loading of the tank and when the ship is sailing.

Figure 5:
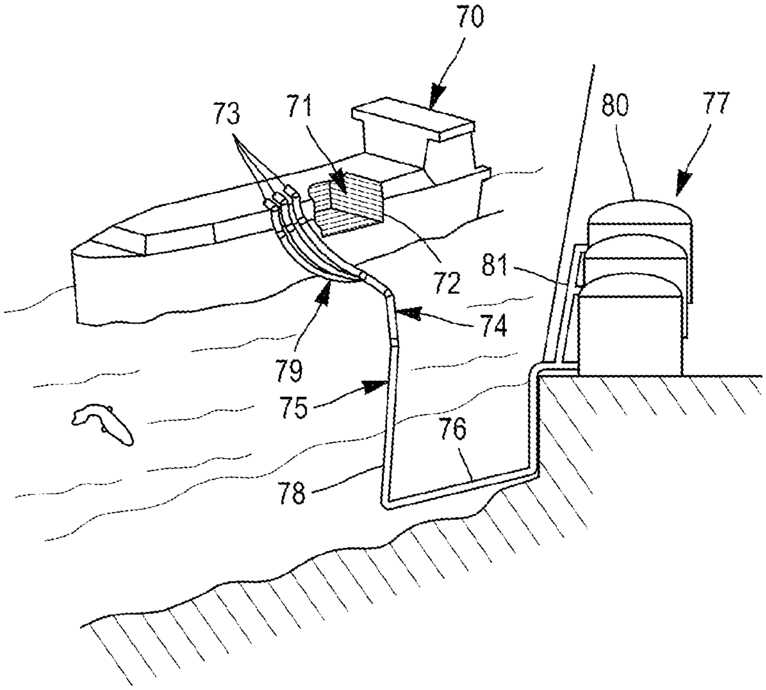
FIG. 5 is a cutaway schematic representation of a methane tanker ship equipped with a tank and a terminal for loading/offloading that tank.

Referring to FIG. 5, a cutaway of a methane tanker ship 70 shows a fluid-tight and insulated tank 71 of prismatic general shape mounted in the double hull 72 of the ship. The wall of the tank 71 includes a primary fluid-tight barrier intended to be in contact with the LNG contained in the tank, a secondary fluid-tight barrier arranged between the primary fluid-tight barrier and the double hull 72 of the ship, and two insulating barriers respectively arranged between the primary fluid-tight barrier and the secondary fluid-tight barrier and between the secondary fluid-tight barrier and the double hull 72.

In a manner known in itself loading/offloading pipes 73 disposed on the top deck of the ship may be connected by means of appropriate connectors to a maritime or harbor terminal to transfer a cargo of LNG from or to the tank 71.

FIG. 5 shows an example of a maritime terminal including a loading and offloading station 75, an underwater pipe 76 and a terrestrial installation 77. The loading and offloading station 75 is a fixed off-shore installation including a mobile arm 74 and a tower 78 that supports the mobile arm 74. The mobile arm 74 carries a bundle of insulated flexible tubes 79 that can be connected to the loading/offloading pipes 73. The orientable mobile arm 74 adapts to all methane tanker loading gauges. A connecting pipe that is not shown extends inside the tower 78. The loading and offloading station 75 enables loading and offloading of the methane tanker 70 from or to the terrestrial installation 77. The latter includes liquefied gas storage tanks 80 and connecting pipes 81 connected via the underwater pipe 76 to the loading or offloading station 75. The underwater pipe 76 enables transfer of the liquefied gas between the loading or offloading station 75 and the terrestrial installation 77 over a great distance, for example 5 km, which enables the methane tanker ship 70 to remain at a great distance from the coast during loading and offloading operations.

Pumps onboard the ship 70 and/or pumps equipping the terrestrial installation 77 and/or pumps equipping the loading and offloading station 75 are used to generate the pressure necessary to transfer the liquefied gas.

Although the invention has been described in connection with a plurality of particular embodiments, it is obvious that it is in no way limited to them and that it encompasses all technical equivalents and combinations of the means described if the latter fall within the scope of the invention defined by the claims.

The use of the verb "to include" or "to comprise" and conjugate forms thereof do not exclude the presence of elements or steps other than those stated in a claim.

In the claims, any reference sign between parentheses should not be interpreted as a limitation of the claim.

The invention claimed is:

1. A method for determining a first value of at least one first parameter of execution of a process for cooling an internal space (11) of a fluid-tight and thermally insulative tank (1) intended to be loaded with liquefied gas, said first parameter being chosen among a setpoint final temperature of the cooling method and a variable operating on the cooling power of the cooling process; said tank (1) including at least a thermal insulation barrier (5) and a sealing membrane (6) supported by the thermal insulation barrier (5) and defining the internal space (11); the method including:

successively testing a plurality of different values of said first parameter until a fault is detected, each phase of testing one of the values of the first parameter including:

cooling the internal space (11) of the tank (1) by delivering a cooling power $P_f$ for a cooling time $\Delta$ until the temperature in the internal space (11) of the tank (1) reaches a setpoint final temperature $T_c$; said cooling power $P_f$ or said setpoint final temperature $T_c$ being representative of the tested value of said first parameter;

loading liquefied gas into the internal space (11) of the tank (1) after cooling;

measuring a variable $P_1$ representative of the pressure inside the thermal insulation barrier (5), the variable $P_1$ being measured during the step of cooling the internal space (11) of the tank (1) or during the step of loading the liquefied gas into the internal space (11) of the tank (1) and comparing it to at least one threshold; and detecting the fault when the variable: $P_1$ crosses the at least one threshold; and choosing, among the plurality of values tested, as the first value of the first parameter the value of the first parameter for which, during the corresponding test phase, the cooling time $\Delta$ is the shortest and no fault has been detected.

2. The method as claimed in claim 1, in which the at least one threshold includes a constant threshold $Ps_1$ that is greater than or equal to atmospheric pressure and in which the fault is detected when the variable $P_1$ is less than or equal to $Ps_1$.

3. The method as claimed in claim 1 or 2, in which, for each test phase, there is measured a variable $P_{tank}$ representative of the pressure inside the internal space (11) of the tank (1), in which the at least one threshold includes a variable threshold corresponding to the variable $P_{tank}$ and in which the fault is detected when the variable $P_1$ is greater than or equal to $P_{tank}$.

4. The method as claimed in claim 1, in which the thermal insulation barrier is a primary thermal insulation barrier, the tank (1) further including a secondary thermally insulation barrier (2) resting against a support structure and a secondary sealing membrane disposed between the secondary thermally insulation barrier (2) and the primary thermal insulation barrier, in which, for each test phase, there is measured a variable $P_2$ representative of the pressure inside the secondary thermal insulation barrier (2), the variable $P_2$ being measured during the step of cooling the internal space (11) of the tank (1) or during the step of loading the liquefied gas into the internal space (11) of the tank (I) and the variable $P_2$ is compared to at least one secondary threshold and in which the fault is detected when the variable $P_2$ crosses said at least one secondary threshold.

5. The method as claimed in claim 4, in which the at least one secondary threshold includes a constant secondary threshold $Ps_2$ that is greater than or equal to atmospheric pressure and in which the fault is detected when the variable $P_2$ is less than or equal to $Ps_2$.

6. The method as claimed in claim 4, in which the at least one secondary threshold includes a variable secondary threshold equal to the variable $P_1$ and in which the fault is detected when the variable $P_2$ is greater than or equal to $P_1$.

7. The method as claimed in claim 1, in which, for each test phase, a variable $P_{tank}$ representative of the pressure inside the internal space (11) of the tank (1) is measured and compared to a constant threshold $Pc_1$ that is greater than atmospheric pressure during the step of cooling the internal space (11) of the tank (1) or during the step of loading the liquefied gas into the internal space (11) of the tank (1) and in which the fault is detected when the variable $P_{tank}$ is greater than or equal to $Pc_1$.

8. The method as claimed in claim 1, in which the tank (1) is integrated into a ship, in which each test phase includes a step of sailing under load in which, after loading the liquefied gas into the internal space (11), the ship sails and in which during said sailing step there is measured a variable $P_{tank}$ representative of the pressure inside the internal space (11) of the tank (1) and the variable $P_{tank}$ is compared to a constant threshold $Pc_2$ that is greater than atmospheric pressure and in which the fault is detected when the variable $P_{tank}$ is greater than or equal to $Pc_2$.

9. The method as claimed in claim 1, in which after the first value of the first parameter has been chosen, a plurality of different values of a second parameter are tested until a second fault is detected, the first and the second parameters respectively corresponding to the setpoint final temperature of the cooling process and to the variable operating on the cooling power during the execution of the process or vice versa; each test phase of one of the values of the second parameter including:

- cooling the internal space (11) of the tank (1) by delivering a cooling power $P_f$ for a cooling time $\Delta$ until the temperature in the internal space (11) of the tank (1) reaches a setpoint final temperature $T_c$; said cooling power $P_f$ and said setpoint final temperature $T_c$ being respectively representative of the first value of the first parameter and of the tested value of said second parameter or vice versa;
- loading liquefied gas into the internal space (11) of the tank (1) after cooling; and
- measuring a variable $P_1$ representative of the pressure inside the thermal insulation barrier (5) the variable $P_1$ being measured during the step of cooling the internal space (11) of the tank or during the step of loading the liquefied gas into the internal space (11) of the tank and comparing it to said at least one threshold; and
- detecting the second fault when the variable $P_1$ crosses said at least one particular threshold; and
- choosing, among the plurality of values tested, as a second value of the second parameter the value of the second parameter for which, during the corresponding test phase, the cooling time $\Delta$ is the shortest and no fault has been detected.

10. The method as claimed in claim 1, in which the internal space (11) of the tank is cooled by means of a cooling unit (9) including at least one spray manifold (10) that is disposed in the internal space (11) of the tank and that includes a plurality of spray nozzles (12) arranged to spray liquefied gas into the internal space (11) of the tank (1).

11. The method as claimed in claim 10, in which the spray manifold (10) is connected to at least one adjustable opening valve adapted to operate on the spray flow rate and in which the variable operating on the cooling power of the cooling process corresponds to the degree of opening of the adjustable opening valve.

12. A process for loading a ship (70) equipped with a fluid-tight and thermally insulative tank intended to store liquefied gas, in which:

- a method as claimed in claim 1 is employed to determine a first value of at least one first parameter of execution of a cooling process;
- the internal space (11) of the tank is cooled until the temperature in the internal space (11) of the tank reaches a setpoint final temperature; the cooling power or the setpoint final temperature being representative of the first value of the first parameter; and
- a liquefied gas is fed through insulated pipes (73, 79, 76, 81) from a floating or terrestrial storage installation (77) to the internal space (11) of the tank.

* * * * *